March 12, 1929.  O. WITTEL  1,705,385
LENS MOUNT FOR CAMERAS
Filed Feb. 1, 1928   2 Sheets-Sheet 1
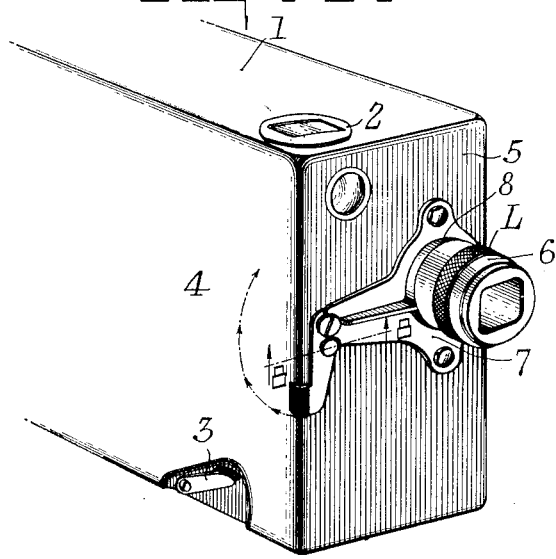
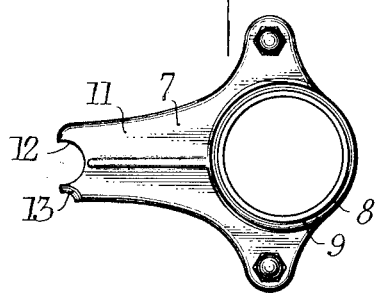
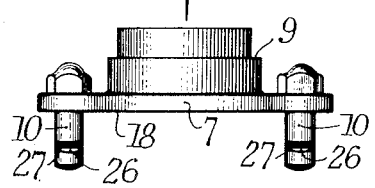
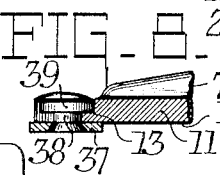
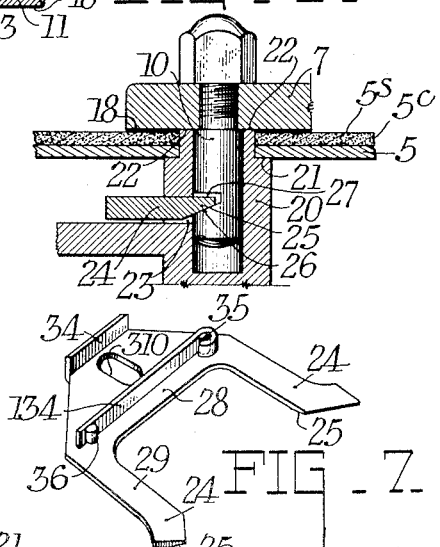
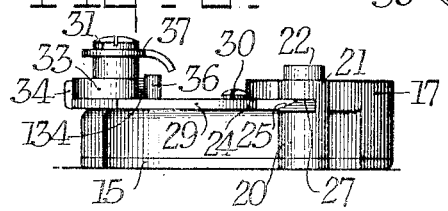
INVENTOR,
Otto Wittel,
BY
ATTORNEYS.

March 12, 1929.  O. WITTEL  1,705,385
LENS MOUNT FOR CAMERAS
Filed Feb. 1, 1928  2 Sheets-Sheet 2
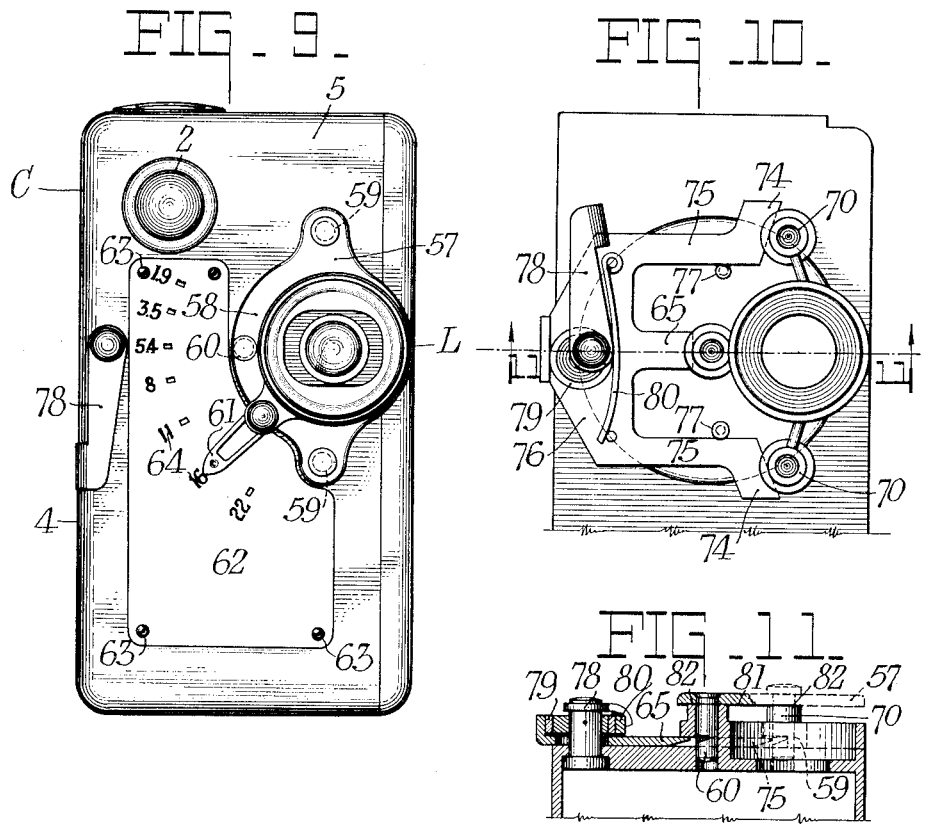
INVENTOR,
Otto Wittel,
BY R. L. Stringfield
Donald H. Stewart
ATTORNEYS.

Patented Mar. 12, 1929.

1,705,385

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

LENS MOUNT FOR CAMERAS.

Application filed February 1, 1928. Serial No. 251,034.

This invention relates to photography and more particularly to lens mounts for photographic cameras which permit lenses to be changed at will. One object of my invention is to provide a lens mount which will accurately position an objective on a camera at a definite predetermined distance from the film gate. Another object of my invention is to provide a latching mechanism for holding a lens mount upon a fixed support. Another object of my invention is to provide a latching mechanism which is arranged to cam a lens mount down onto the support and to provide a latching mechanism which may be readily released for changing objectives. Another object of my invention is to provide a pair of cooperating cams for holding a lens mount on a camera and to provide one of the cams with a resilient mount which will automatically care for manufacturing tolerances. Still another object of my invention is to provide a latching mechanism operated by a lever on the outside wall of a camera. And other objects will appear from the following specification, the novel features being particularly pointed out in the claims at the end thereof.

Coming now to the drawings wherein like reference characters denote like parts throughout:

Fig. 1 shows a perspective view of a camera equipped with a lens mount constructed in accordance with and embodying a preferred form of my invention;

Fig. 2 is a plan view of the objective carrying member removed from the camera;

Fig. 3 is a side elevation of the parts shown in Fig. 2;

Fig. 4 is a front plan view of the front plate of the camera after the housing has been removed;

Fig. 5 is an enlarged sectional detail on line 5—5 of Fig. 4;

Fig. 6 is a side elevation of the latching mechanism shown in Fig. 4;

Fig. 7 is a perspective view of the latching member removed from the camera;

Fig. 8 is a fragmentary detail section on line 8—8 of Fig. 1;

Fig. 9 is a front elevation of a second preferred embodiment of my invention showing a lens mount mounted on a camera;

Fig. 10 is a view of the front plate of the camera shown in Fig. 9 with the housing removed; and Fig. 11 is a section on line 11—11 of Fig. 10.

While my lens mount is suitable for use on any type of camera, it is particularly adapted for use on motion picture cameras, and, as shown in Fig. 1, the lens mount designated broadly as L may be carried on a camera here shown as consisting of a boxlike body portion 1 provided with the usual finder 2 and exposure lever 3 mounted on the side 4 of the camera. The front 5 carries the objective. Since other details of the camera are not necessary to understand my invention, the camera will not be further described.

The objective may be carried in a focusing mount 6 of any desirable type, this mount being supported upon a member 7 which is here shown as consisting of a casing having a tubular extension 8 preferably provided with a shoulder 9 for receiving a lens mount 6. Obviously any desired lens mount can be mounted on member 7, it being customary in small motion picture cameras to provide different aperture and focal length objectives for the same camera.

Member 7 is provided with a pair of downwardly extending protuberances 10 and a side arm 11, this arm having a semi-circular cutout 12, near which is a second semi-circular flange 13, best shown in Figs. 2 and 8.

Inside of the front wall 5 of the camera is the front plate shown in Fig. 4, this plate normally carrying the camera shutter and the usual film gate which are not shown. It may consist of a casting 14 provided with a shutter housing 15 and a lens barrel support designated broadly as 16. This support consists of a tubular flange 17 adapted to engage or come close to the flat lower surface 18 of member 7, there being a central aperture 19 through which light rays pass to the film. On each side of member 17 there is a tubular extension 20 which form seats for the protuberances 10. As best shown in Fig. 5, the tubular extensions 20 are provided with shoulders 21 upon which the front wall 5 of the camera with its leather covering 5ᶜ may be seated in assembling the camera.

From Fig. 5 it should be noticed that the top 22 of the tubular extension lies slightly above the surface 5ª of the leather so that the lower edge 18 of member 7 rests upon the tubular extensions 22 when seated on the camera rather than upon the surface of the leather itself.

The tubular extensions are provided with slots 23 which extend a sufficient distance to permit the latching member ends 24 to move from the position shown in full lines, Fig. 4, to the position shown in broken lines in the same figure. Members 24, as shown in Fig. 5, are provided with cam surfaces 25 adapted to engage the cam surfaces 26 of protuberances 10, this latter cam being provided by cutting a slot 27 in the protuberance.

The latching mechanism which includes the cams 25 comprises a U-shaped member 28 having arms 29 which support members 24, and which loosely engage the screws 30, this engagement being such that the U-shaped member may rock about the stud 31 which passes through the elongated opening 310. In order to move the U-shaped member a cam 32 is mounted on the stud 31, and this cam has a working surface 33 engaging a flange 34 extending upwardly from the U-shaped member, the cam 33 also engaging a spring arm 134, which is mounted upon a stud 35 on the U-shaped member at one end and which engages a second stud 36 at the other end. Thus it will be seen that as the handle 37 is moved in the direction of the arrows A the cam 33 is turned so as to press upon the spring 134 and thrust the latching cams 25 into contact with the protuberance cams 26. This action, because of spring 34, is resilient so that if the cams 25 and 26 bind before the movement of the handle 37 is completed the U-shaped member may stop moving, and the additional movement of cam 33 will merely place spring 134 under greater tension.

The lever 37 which actuates cam 33 is provided with a stud 38, the head of which 39, as shown in Fig. 8 is adapted to engage in the arcuate flange portion 13 of member 7 when this member is in position on the camera front of the arcuate portion 12 in contact with the stud 31. This position is shown in Fig. 1. It should be noticed that the pair of protuberances 10 and the contact of the cutout 13 with the stud 38 forms a three-point support for the lens mount which can be readily made very accurate so that objectives may be accurately positioned for exposure.

It is sometimes useful to provide a mount which can be used with a scale plate on the camera, Figs. 9 to 11 inclusive illustrating such an embodiment of my invention.

Here the camera C is provided with a front wall 5, finder 2, and a lens mount L. This lens mount includes a member 57 which differs from member 7 shown in Fig. 2 in that it has no extending side arm 11. Member 57 is provided with a flange 58 in which are mounted a pair of protuberances 59 similar to protuberances 10 in Fig. 3, and a flat top protuberance 60 extends from the bottom of flange 58, but is otherwise similar to the protuberance 59. The top of protuberance 60 does not extend above the flange 58, consequently, a diaphragm lever 61 may swing freely over a diaphragm plate 62 attached by screws 63 to the camera front 5 and bearing a diaphragm scale plate 64.

The latching member differs slightly from the previously described latch in that a third cam latching member is employed to engage a third protuberance 60, as shown in Fig. 11.

As in the first described embodiment, protuberances 59 may be latched in their seats 70 by means of latching members 74 which are carried by arms 75 of member 76, the arm 75 being guided more or less by pins 77. As the action of the latching handle 78, the cam 79, and the spring 80 is the same as in the first described embodiment of my invention, it will not be again described.

In this last embodiment of my invention the smooth inside surface 81 of member 57 (see Fig. 11) engages the accurately located top surfaces 82 of the protuberance seats so that in this way the objective mount may be quickly and accurately positioned upon the camera.

The operation of both embodiments of my invention is alike, that is, in order to remove a lens mount L from a camera front 5, a lever 37 or 78 is swung from the camera side wall 4, as indicated by the arrows, Fig. 1. This movement causes the latching plate to be moved so that the cams are positively withdrawn from the protuberance seats, thus permitting the camera objective to be removed from the camera.

By merely inserting the protuberances in their respective seats and swinging the lever down an objective may be accurately positioned.

It should be noted in the first embodiment of my invention that the lens mount can be placed on the camera in only one position, because of the location of the three-point contact. Similarly the second embodiment of my invention may also be placed on the camera in only one way, since the proturberances must engage their respective seats which are unsymmetrically arranged before the light opening.

In both embodiments of my invention the latching mechanism, except for the operating handle is concealed beneath the front camera wall 5, and the lens mounts L do not differ in appearance from the usual objective mount. This construction, therefore, makes a simple and easily operated objective latching and detaching structure, and one which may be readily operated under severe climatic conditions without difficulty.

By providing the flat surfaces 22 or 82 of the support accurately in a predetermined plane, it is obvious that the wedging action of the latching cams draw downward upon the protuberances and thus hold the lens barrel upon the camera firmly in an accurate position. The action of the handle through the spring 134 or 80 resiliently presses the cams into contact with the protuberance slots insuring a firm seating of the lens barrel at all times.

Having thus described my invention, what I claim as new and desire to secure by Letters Patent is:

1. In a lens mount for cameras the combination with a lens barrel, of an apertured barrel support, a plurality of protuberances on the lens barrel adapted to engage the apertures of the support, and means for latching the protuberances in their apertures.

2. In a lens mount for cameras, the combination with a lens barrel, of a barrel support having apertures forming seats therein, a plurality of protuberances carried by the lens barrel adapted to be moved into the seats, and latching means including a cam for holding the protuberances in the seats.

3. In a lens mount for cameras, the combination with a lens barrel, of a protuberance extending from the barrel including a cam, a barrel support having a seat therein adapted to receive the protuberance, and means including the cam for latching the barrel on the support.

4. In a lens mount for cameras, the combination with a lens barrel, of a protuberance extending from the barrel including a cam, a barrel support having a seat therein adapted to receive the protuberance, and a movable latching bar adapted to engage the cam and hold the barrel to the support.

5. In a lens mount for cameras, the combination with a lens barrel, of a protuberance extending from the barrel including a cam, a barrel support having a seat therein adapted to receive the protuberance, and latching means movably mounted near the seat and adapted to move into the seat for holding the barrel to the support.

6. In a lens mount for cameras, the combination with a support having seats therein, of a lens barrel, projections on the lens barrel for engaging the seats, and a latching device including a slidable plate movable to and from a latching position, a handle for moving the plate, a spring acted upon by the handle and adapted to resiliently move the plate to its latching position.

7. In a lens mount for cameras, the combination with a support having seats therein, of a lens barrel, projections on the lens barrel for engaging the seats, and a latching device including a slidable plate movable to and from a latching position, a handle for moving the plate, a spring acted upon by the handle and adapted to resiliently move the plate to its latching position, and positive means actuated by the handle for moving the plate from its latching position.

8. In a lens mount for cameras, the combination with a lens barrel, of a barrel support carried by the camera, means for latching the barrel to the support including latching mechanism carried beneath the front wall of the camera, and means outside of the wall for operating the latching mechanism.

9. In a lens mount for cameras, the combination with a lens barrel, of projections on the lens barrel having slots therein, a lens support carried by a camera wall, and mechanism concealed by the camera wall for engaging the slotted projections on the lens barrel for holding said barrel upon said support.

10. In a lens mount for cameras, the combination with a lens barrel, of protuberances thereon, an apertured support carried by a camera wall, a latching mechanism concealed by the camera wall and cooperating with the protuberances for locking the lens barrel to the support, and means for operating the latching mechanism including a handle, said handle being mounted on the opposite side of the camera wall from the latching mechanism.

11. In a lens mount for cameras, the combination with a lens barrel, of protuberances extending therefrom, an apertured lens barrel support, a latching device carried by the support and adapted to engage the protuberances, said latching device including a movably mounted plate, a spring, and a cam for moving the plate through the spring, and a lever for operating the cam.

12. In a lens mount for cameras, the combination with a lens barrel, of protuberances extending therefrom, an apertured lens barrel support, a latching device carried by the support and adapted to engage the protuberances, said latching device including a movable mounted plate, a spring, and a cam for moving the plate through the spring, a flange carried by the plate in the path of the cam, and a lever for moving the plate through the spring to a latching position, said lever also moving the plate through the cam and flange from a locking position.

13. In a lens mount for cameras, the combination with a lens barrel, of a support into which parts of the lens barrel may fit, means for latching the parts together including a movable plate, means for resiliently thrusting the plate into a latching position, and means for positively moving the plate from its latching position.

14. In a lens mount for cameras, the combination with a lens barrel, of a support on a camera for the lens barrel including a flat surface, and means including a cam for drawing the lens barrel down against the flat surface of the support.

15. In a lens mount for cameras, the combination with a lens barrel, of an apertured support on a camera for the lens barrel, said support including a flat surface, a protuberance on the lens barrel adapted to engage the aperture of the support, and means including a cam acting on the protuberance for drawing the lens barrel into close contact with the flat surface of the support.

16. In a lens mount for cameras, the combination with a lens barrel, of an apertured support on a camera for the lens barrel, said support including a flat surface, a protuberance on the lens barrel adapted to engage the aperture of the support, and a cam adapted to engage the protuberance to draw the barrel into contact with the support, and means including a spring for moving the cam.

17. In a lens mount for cameras, the combination with a lens barrel, of an apertured support on a camera for the lens barrel, said support including a flat surface, a protuberance on the lens barrel adapted to engage the aperture of the support, said protuberance having a slot therein, a cam adapted to engage the slot and to draw the lens barrel down onto the flat surface of the support, and means accessible to an operator for moving the cam.

18. In a lens mount for cameras the combination with a lens barrel, of an apertured support on a camera for the lens barrel, said support including a flat surface, a protuberance on the lens barrel adapted to engage the aperture of the support, said protuberance having a slot therein, a spring actuated cam adapted to engage the slot and to draw the lens barrel down onto the flat surface of the support, and means accessible to an operator for moving the cam.

Signed at Rochester, New York, this 27th day of January, 1928.

OTTO WITTEL.